United States Patent
Nakano et al.

(10) Patent No.: US 6,644,760 B2
(45) Date of Patent: Nov. 11, 2003

(54) HYDRAULIC PRESSURE CONTROL DEVICE AND VEHICLE BRAKE DEVICE USING THE SAME

(75) Inventors: Keita Nakano, Itami (JP); Masato Yoshino, Itami (JP); Makoto Nishikimi, Itami (JP)

(73) Assignee: Sumitomo (SEI) Brake Systems, Inc., Mie (JP)

( * ) Notice: Subject to any disclaimer, the term of this patent is extended or adjusted under 35 U.S.C. 154(b) by 0 days.

(21) Appl. No.: 10/050,992

(22) Filed: Jan. 22, 2002

(65) Prior Publication Data

US 2002/0105224 A1 Aug. 8, 2002

(30) Foreign Application Priority Data

Jan. 23, 2001 (JP) .......................................... 2001-14903

(51) Int. Cl.[7] .............................. B60T 8/38; B60T 8/88; B60T 13/45
(52) U.S. Cl. ................................. 303/117.1; 303/113.5; 303/122; 188/359; 188/355
(58) Field of Search ................................. 188/355, 358, 188/359, 360; 303/113.5, 117.1, 119.1, 119.2, 113.1, 122, 122.09; 60/547.1, 578, 579, 581, 582

(56) References Cited

U.S. PATENT DOCUMENTS 5,221,126 A * 6/1993 Inoue ........................ 303/117.1
5,372,412 A * 12/1994 Yagi ......................... 303/117.1
5,496,101 A * 3/1996 Kurokawa et al. .......... 303/117.1

FOREIGN PATENT DOCUMENTS

| JP | 11227581 | 8/1999 |
|---|---|---|
| JP | 2000177562 | 6/2000 |
| JP | 2000326839 | 11/2000 |

OTHER PUBLICATIONS

English Language Abstract for 2000–177562.
English Language Abstract for 2000–326839.
English Language Abstract of JP 2000–326839.
English Language Abstract of JP 11–227584.

* cited by examiner

*Primary Examiner*—Jack Lavinder
*Assistant Examiner*—Thomas Williams
(74) *Attorney, Agent, or Firm*—Greenblum & Bernstein, P.L.C.

(57) ABSTRACT

A hydraulic pressure control device is provided in which a proportional pressure control valve is actuated by operating the brake pedal to adjust the hydraulic pressure supplied from a pressure source to the wheel brakes to a value corresponding to the pedal operating amount. Also, a brake device for a vehicle using it is provided. The proportional pressure control valve is integrated with a hydraulic pressure generator to transmit the input from the brake pedal to a spool valve in the control valve through a first piston, first spring, second piston and second spring of the hydraulic pressure generator. If the pressure source or the wheel brakes in a first line fail, after the second piston has made a full stroke, brake fluid in a fluid chamber is pressurized, so that the hydraulic pressure generated is supplied to wheel brakes in a second line through a copy valve which is open.

20 Claims, 10 Drawing Sheets

HYDRAULIC PRESSURE CONTROL DEVICE AND VEHICLE BRAKE DEVICE USING THE SAME

BACKGROUND OF THE INVENTION

This invention relates to a hydraulic pressure control device for a vehicle in which a proportional pressure control valve having a built-in spool valve is actuated by the force applied to the brake pedal to adjust (or amplify) the hydraulic pressure for the wheel brakes to a proper pressure, and more specifically a hydraulic pressure control device in which even if a pressure source including a power-driven pump fails so that the supply of hydraulic pressure therefrom has stopped, the brakes can be applied, and a brake device which uses it to improve travel safety.

A so-called brake-by-wire type vehicle brake device has been developed in which in order to electrically control the braking force applied to the vehicle, the hydraulic pressure generated by the brake operation by the driver is converted to an electric signal and the hydraulic pressure generated in the power line (that is, pressure source including a power-driven pump) is adjusted to a value corresponding to the electric signal before supplied to the wheel brakes.

Also, a proportional pressure control valve suitable for use with such a brake-by-wire type brake device has been developed and actually used.

FIG. 10 shows an example. In this proportional pressure control valve 60, a spool valve 62 is inserted in a housing 61 having an input port 61a, an output port 61b and a discharge port 61c to selectively connect the output port 61b to the input port 61a or the discharge port 61c by driving the spool valve 62 with a magnetic force generated by activating a coil 63a of a solenoid 63 and to adjust the degree of opening of passages defined between a shoulder portion on the outer periphery of the spool valve 62 and the edge of each port.

The input port 61a is connected to a pressure source 67 having a power-driven pump P and a pressure accumulator Acc. Also, the output port 61b is connected to wheel brakes 68 and the discharge port 61c is connected to a reservoir 69. By changing over the connection of these ports by the spool valve 62, the wheel brake pressure is increased and decreased, and in some cases, the output port 61b is separated from both the input port 61a and discharge port 61c to hold the wheel brake pressure.

The spool valve 62 has a difference in area between its pressure-bearing surfaces opposite to each other, the difference being equal to the sectional area of a pin 65 inserted in a pin hole 64. Thus, assuming that the hydraulic pressure introduced through the input port 61a is P, the force of a return spring 66 is F, the current supplied to the coil 63a is I, and the sectional area of the pin 65 is S, the thrust force acting against the spool valve 62 balances at a position where the following formula is met:

$$P \cdot S + F = a \cdot I^2 \text{ (a is a constant)}$$

and the spool valve 62 stops at such a position.

The above formula is replaced with $$P = (a \cdot I^2 - F)/S$$

In this formula, a and S are constants. If the spring constant is ignored, F can also be regarded as a constant. Thus, the hydraulic pressure P is proportional to the square of the current I and corresponds to an electric signal controlling the current I, i.e. the brake operating amount that generates the signal.

The present inventors considered actuating the above-described proportional pressure control valve with a brake pedal.

A device in which the operating force of the brake pedal is used to drive the spool is disclosed e.g. in Japanese patent publication 2000-326839. In the device, only in an emergency (when electric line fails), the spool is adapted to be driven by the brake pedal, while in a normal state the spool is driven electrically. Thus, electronic control is indispensable, so that the device is complicated.

In contrast, in the device the present inventors have conceived, the brake pedal is coupled to the spool valve so that not only in an emergency but in a normal state, the spool is driven by the operating force to the brake pedal. Thus, in case braking force control is not necessary such as during regenerative blending braking, a braking force corresponding to the brake operating amount can be generated without electronic control.

With the device the present inventors are considering or the device disclosed in Japanese patent publication 2000-326839, the supply of hydraulic pressure to the wheel brakes is made only from the pressure source having a power-driven pump. Thus, while the pressure source is normal, even if the electric line should fail, it is possible to apply the brakes by driving the spool valve with the brake pedal. But if the pressure source fails and the supply of hydraulic pressure therefrom stops, the brakes would not work.

An object of this invention is to increase travel safety of the vehicle by eliminating such a trouble.

SUMMARY OF THE INVENTION

According to this invention, there is provided a hydraulic pressure control device comprising a housing formed with an input port, an output port and a discharge port, and a proportional pressure control valve and a hydraulic pressure generator mounted in the housing, the proportional pressure control valve having a spool valve and a return spring for biassing the spool valve, the spool valve bringing the output port into communication with the discharge port in a non-operated state, bearing hydraulic pressure on its opposed pressure-bearing surfaces having a difference in area, and moving to a balance point where the sum of the hydraulic pressure and the force of the return spring balances with an external force applied opposite thereto to change over connections of the output port to the input port and the discharge port, adjust the degree of opening of fluid passages, and adjust the hydraulic pressure at the output port to a value corresponding to the external force, the hydraulic pressure generator combined with the proportional pressure control valve, the hydraulic pressure generator comprising a second piston for transmitting a force to the spool valve through a second spring, a first piston for transmitting a force to the second piston through a first spring and an output port, wherein the first piston receives the brake pedal force as the external force, pressurizes and outputs brake fluid introduced into a fluid chamber between the first piston and the second piston.

Also, there is provided a brake device for a vehicle comprising the hydraulic pressure control device mentioned above, a pressure source connected to the input port of the hydraulic pressure control device, wheel brakes in a first line connected with said output port, wheel brakes in a second line connected with the output port of the hydraulic pressure generator, and a copy valve actuated by the hydraulic pressure difference between the first line and the second line to open and close a passage extending from the hydraulic pressure generator to the wheel brakes in the second line, the copy valve having a piston bearing fluid pressure in the first line on one side for pressurizing the wheel brakes in the second line, and a reservoir connected to the discharge port of the proportional pressure control valve, wherein brake fluid is supplied from the reservoir to a fluid chamber between the first and second pistons of the hydraulic pressure generator, and during failure of the pressure source, the hydraulic pressure generated in the hydraulic pressure generator is supplied to the wheel brakes in the second line.

The hydraulic pressure generator may be one in which the spring force of its first spring is greater than the sum of the force of the second spring and its sliding resistance or one in which a reactive force spring for returning the brake pedal is disposed between the second piston and the proportional pressure control valve. With the former hydraulic pressure generator, it is possible to lighten the force applied to the brake pedal during failure of the power source by providing a pressure-bearing unit having a piston for bearing the hydraulic pressure of the pressure source on one side and supporting one end of the reaction-force spring on the other side of the piston of the pressure-bearing unit. Also, with the latter hydraulic pressure generator, it is possible to generate hydraulic pressure immediately after depressing of the brake pedal during failure of the pressure source or the first line. Further, the reaction-force spring can be mounted in the hydraulic pressure control device.

The hydraulic pressure control device of this invention includes a hydraulic pressure generator that pressurizes brake fluid with the operating force to the brake pedal and outputs it. The brake device using it can pressurize the wheel brakes in the second line with the hydraulic pressure generated in the hydraulic pressure generator if the pressure source or the first line fails. Also, during failure of the second line, it is possible to pressurize the wheel brakes in the first line with the hydraulic pressure adjusted by the proportional pressure control valve. Thus, even if a failure occurs anywhere, at least one line will positively survive, so that reliability improves.

Preferred embodiments and their functions and effects will be detailed below.

Other features and objects of the present invention will become apparent from the following description made with reference to the accompanying drawings, in which:

DETAILED DESCRIPTION OF THE PREFERRED EMBODIMENT

Figure 1:
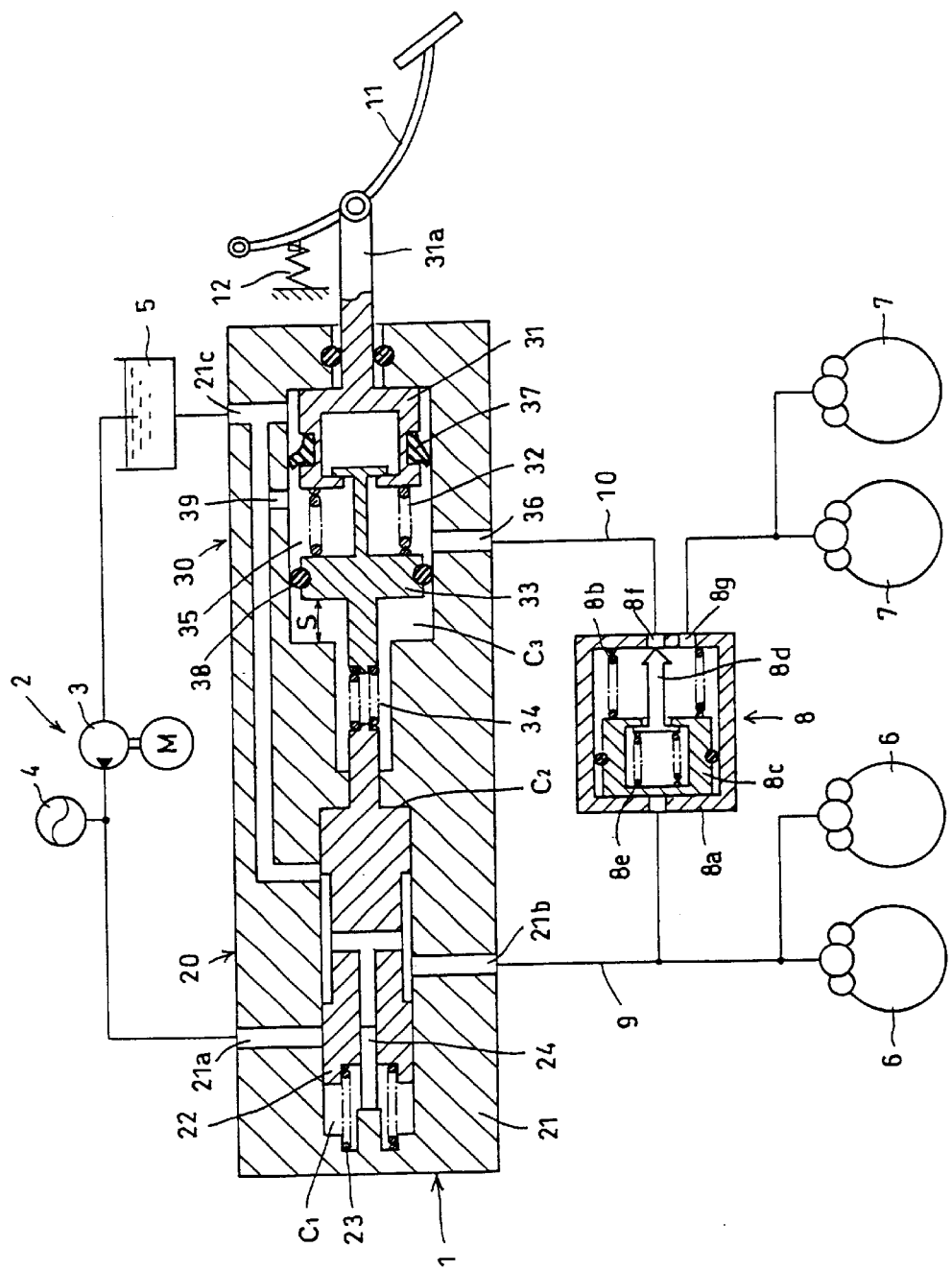
FIG. 1 is a view showing a first embodiment of the hydraulic pressure control device and the brake device.

FIG. 1 shows the first embodiment of this invention. A hydraulic pressure control device 1 has a pressure source 2 having a power-driven pump 3 and a pressure accumulator 4, a reservoir 5, wheel brakes 6 in a first line, wheel brakes 7 in a second line, a copy valve 8 provided between a passage 9 in the first line and a passage 10 in the second line, a brake pedal 11 and a reaction-force spring 12 for applying reactive force and returning force to the brake pedal 11.

In the hydraulic pressure control device 1, a proportional pressure control valve 20 and a hydraulic pressure generator 30 are combined together.

Figure 10:
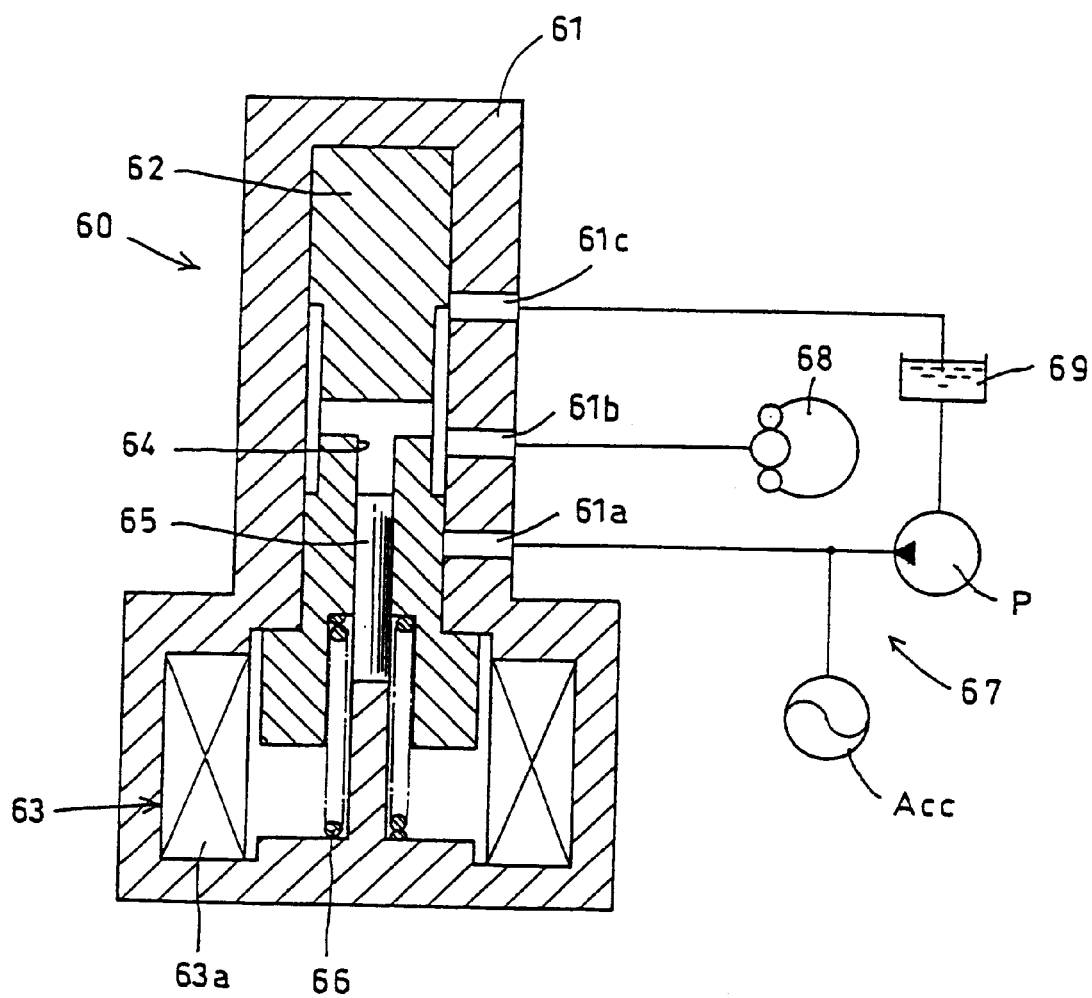
FIG. 10 is a view showing a conventional proportional pressure control valves.

The proportional pressure control valve 20 comprises in a housing 21 a spool valve 22, a return spring 23 for biasing the spool valve rightwardly in FIG. 1, and a pin 24 for creating a predetermined difference in area between opposed pressure-bearing surfaces of the spool valve 22. In the proportional pressure control valve 20, a solenoid for driving the spool valve is omitted and the spool valve 22 is adapted to be actuated by the input to the brake pedal 11 as an external force. Except this point, it does not differ from the control valve of FIG. 10.

With the pressure source 2 connected to the input port 21a of this proportional pressure control valve 20, the wheel brakes 6 in the first line connected to the output port 21b, and the reservoir 5 connected to the discharge port 21c, respectively, the hydraulic pressure supplied from the pressure source 2 is adjusted to a value corresponding to the input from the brake pedal 11 (that is, value amplified in a predetermined ratio) and supplied to the wheel brakes 6 in the first line.

The hydraulic pressure generator 30 comprises a first piston 31, a first spring 32, a second piston 33 and a second spring 34 that are mounted in an extended portion of the housing 21. The first piston 31 has an input rod 31a. The operating force applied to the input rod 31a from the brake pedal 11 is transmitted through the first spring 32 to the second piston 33 and is further transmitted therefrom through the second spring 34 to the spool valve 22. Also, the spring force of the first spring 32 is set to be greater than the force which is the sum of the force of the second spring 34 and the sliding resistance of the second spring.

A fluid chamber 35 is provided between the first and second pistons and the hydraulic pressure generator 30 has an output port 36. The passage 10 in the second line is connected to the output port 36. A seal 37 for sealing the outer periphery of the first piston 31 and a seal 38 for sealing the outer periphery of the second piston 33 are provided. The seal 37 is preferably a one-way seal that allows a fluid flow from the reservoir 5 to the fluid chamber 35. The fluid chamber 35 communicates with the reservoir 5 through a passage 39. Chambers C1, C2 and C3 in the housing 21 communicate with the reservoir 5. But passages therefor are not shown in the figures. This is true for the below-described devices, too.

The copy valve 8 has a piston 8c and a valve body 8d mounted in a cylinder 8a. The former bears the hydraulic pressure in the first line on one side and the hydraulic pressure in the second line and the force of the spring 8b on the other side. The valve body 8d is held by the piston 8c and biased in the valve-closing direction by the spring 8e.

When the thrust by the hydraulic pressure in the first line exceeds the thrust applied against it, the piston 8c moves rightwardly in FIG. 1 to close the input port 8f with the valve body 8d. Thereafter, the piston 8c further moves to pressurize the brake fluid in the second line sealed in the downstream side (wheel brake side) of the input port closing point.

In the brake device of FIG. 1 having such a structure, when the brake pedal 11 is depressed, the pistons 31 and 33 in the hydraulic pressure generator 30 are pushed leftwardly in the figure (movement of the pistons during normal braking is within the range of the stroke S), so that the spool valve 22 is actuated by the force transmitted through the second spring 34. Thus, the hydraulic pressure in the pressure source 2 is adjusted to a value corresponding to the input from the brake pedal 11 and supplied to the wheel brakes 6 in the first line. Also, the piston 8c moves rightwardly in the figure under the hydraulic pressure in the first line, so that the input port 8f is closed. Thereafter, the piston 8c moves rightwardly in the figure until the wheel brakes in the second line are under the same pressure as those in the first line. Since the pressure of the fluid pressurized by the piston 8c is higher than the pressure in the fluid chamber 35, the input port 8f is held closed, so that the wheel brakes 7 in the second line are also pressurized. If e.g. the hydraulic pressure generator 30 fails, pressurization is done in a similar manner to the above.

On the other hand, if the pressure source 2 or the first line fails so that the supply of hydraulic pressure to the first line therefrom is stopped, after the second piston 33 has made a full stroke, the first piston 31 is further pushed in while compressing the first spring 32 to pressurize the brake fluid in the fluid chamber 35. The hydraulic pressure generated therein flows to the wheel brakes 7 in the second line through the input port 8f, which is kept open because the the first line is not pressurized. Thus, even if the pressure source 2 fails, it is possible to apply the brakes. When returning, the first piston 31 brings the second piston 33 back to the original position.

Figure 2:
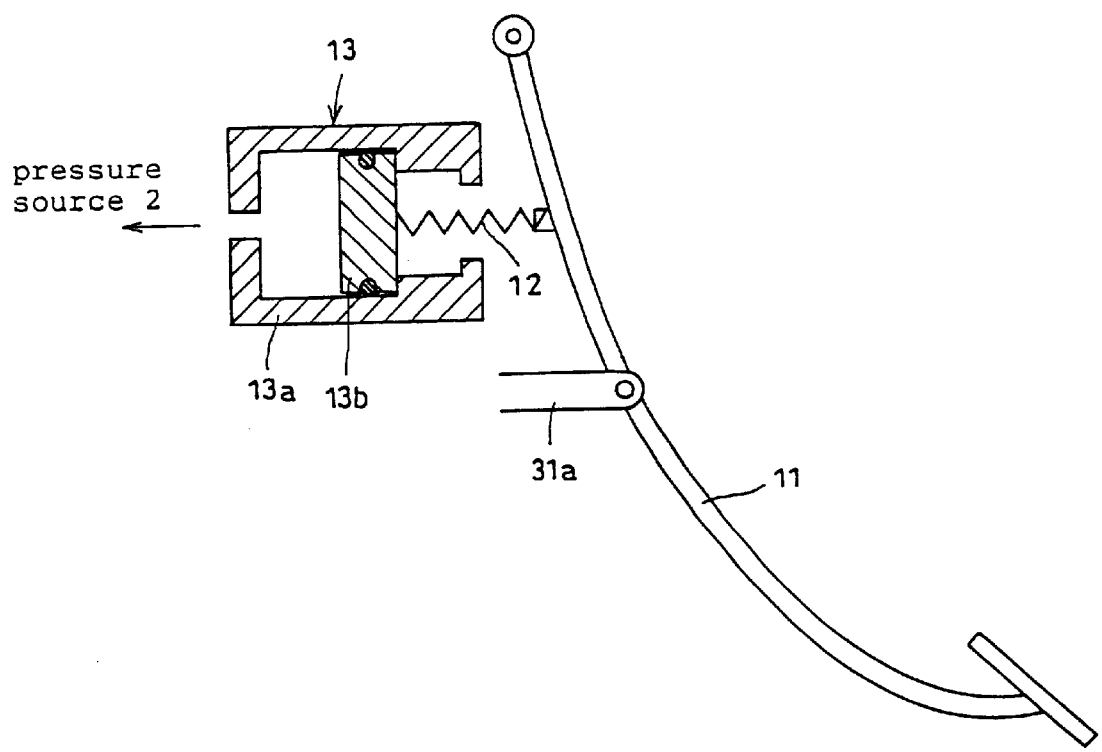
FIG. 2 is a view showing an example in which the reaction-force spring of the brake device of FIG. 1 is supported by the pressure-bearing unit.

FIG. 2 shows a pressure-bearing unit 13 for making the brake device of FIG. 1 more advantageous. The pressure-bearing unit 13 is provided with a piston 13b in a cylinder 13a. It holds the piston 13b against the travel end point on the right side of the figure by applying hydraulic pressure introduced from the pressure source 2 of FIG. 1 to one side of the piston 13b, and supports the reaction-force spring 12 on the other side of the piston 13b. By providing the pressure-bearing unit 13, when the brake pedal is depressed if the hydraulic pressure in the pressure source 2 is lost, the brake pedal 11 is pushed in with a light stepping force to a position where the piston 13b retracts and the second piston 33 makes a full stroke. Thus, due to a difference in pedal feeling from the normal state, the driver will notice a failure in the first line. Also, due to reduction in the reactive force, the hydraulic pressure generated by the hydraulic pressure generator 30 increases due to the stepping force ratio, so that braking force obtained upon failure of the pressure source or the first line increases.

The proportional pressure control valve 20 employed in the brake device of FIG. 1 has no solenoid for driving the spool valve. But a solenoid may be provided if it is required to amplify the operating force to the brake pedal (pedal force) and apply it to the spool valve 22 or it is required that the relation between the pedal force and the hydraulic pressure adjusted by the proportional pressure control valve 20 be variable.

Any of the proportional pressure control valves 20 in the below-described devices of FIGS. 3, 4, 6, 7 and 9 is provided with a solenoid 25.

Solenoids are available in three types, i.e. one that applies force in the pressure-increasing direction (the same direction as the input from the brake pedal) to the spool valve 22, one that applies force in the pressure-reducing direction, and one that selectively applies forces in the pressure-increasing direction and the pressure-reducing direction. If necessary, one suitable for the control purpose may be selected from among them.

Figure 3:
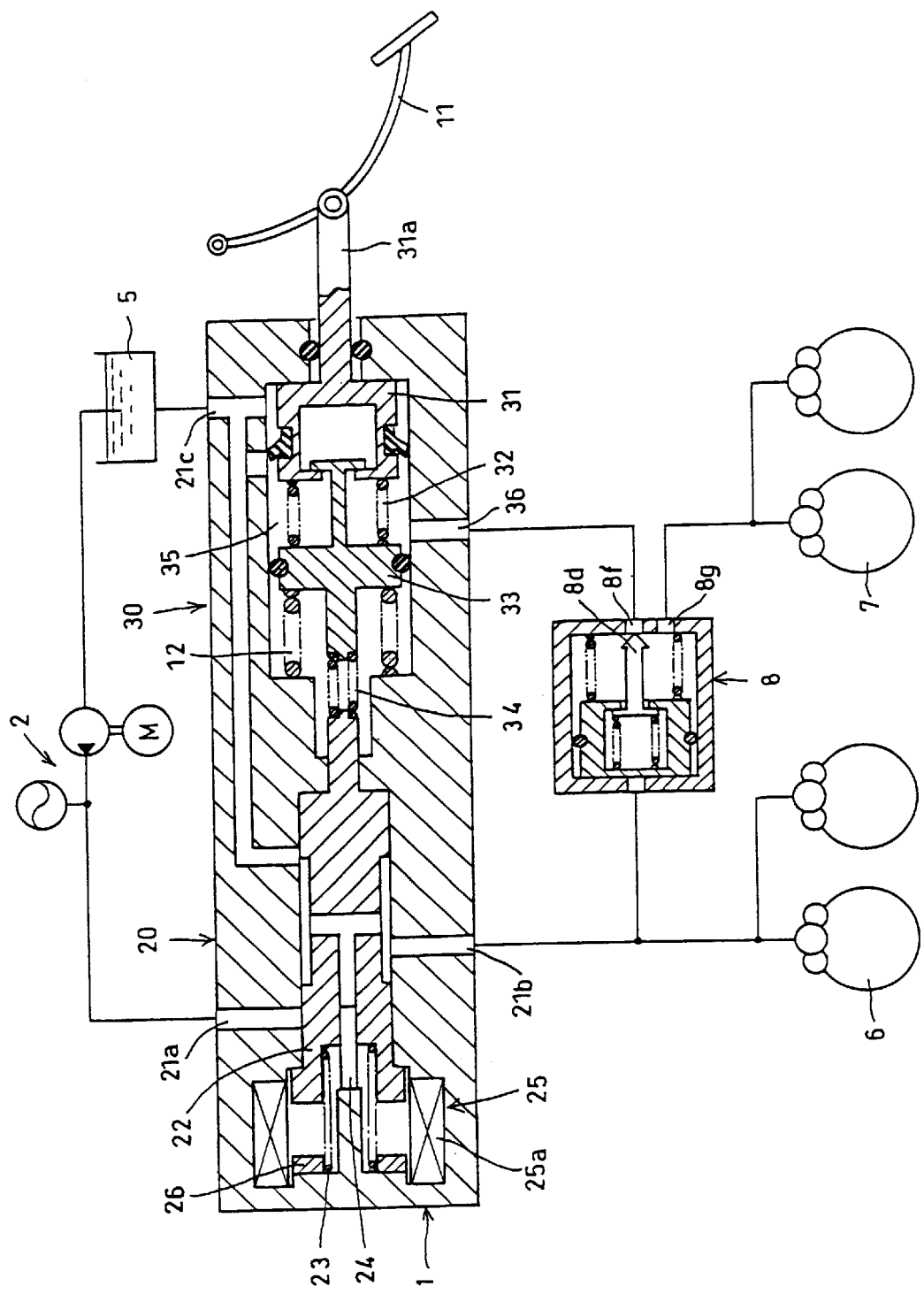
FIG. 3 is a view showing a second embodiment.

The solenoid 25 provided in each of the devices of FIG. 3 and the subsequent figures has a permanent magnet 26 which faces an end face of the spool valve 22 and generates a force in the pressure-increasing direction and one in the pressure-reducing direction by reversing the direction of the current supplied to its coil 25a.

FIG. 3 shows the second embodiment in which the reaction-force spring 12 is arranged in the housing 21 between the second piston 33 and the proportional pressure control valve 20.

If the copy valve 8 closes while the brake pedal is being operated, the brake fluid from the fluid chamber 35 has nowhere to go, so that the brake fluid sealed in the fluid chamber 35 and the operating amount applied to the first piston 31 will be transmitted to the second piston 33 through the first spring 32 as it is. Thus, even if the reaction-force spring 12 is mounted in the hydraulic pressure control device, it will not be affected by the moving resistance or the forces of the springs 12 and 32. Thus, for example, even if the force of the reaction-force spring 12 is greater than the force of the first spring 32, no problem will occur in the hydraulic pressure control.

In case of a failure of the pressure source or the first line, since the copy valve 8 is kept open, output from the fluid chamber 35 is obtained, by arranging such that the fluid chamber 35 is compressed by the input from the brake pedal 11 and the force of the reaction-force spring 12, it is possible to generate a hydraulic pressure corresponding to the pedal force in the fluid chamber 35 from the point of time when the driver begins to depress on the brake pedal 11, and apply pressure to the wheel brakes 7 in the second line with the hydraulic pressure.

Although with this structure it is possible to generate hydraulic pressure corresponding to the pedal force from when the driver begins to depress the brake pedal, if the wheel brake pressure is adapted to be controlled to a lower value than the intent of the driver for e.g. regenerative braking control, the hydraulic pressure adjusted by the proportional pressure control valve 20 may become lower than the pressure generated in the fluid chamber 35. In such a case, the input port 8f of the copy valve 8 opens due to the hydraulic pressure difference between upstream and downstream, so that the hydraulic pressure from the hydraulic pressure generator 30 flows toward the wheel brake side. Thus, the pressure of the wheel brakes 7 cannot be reduced to a desired pressure.

Figure 4:
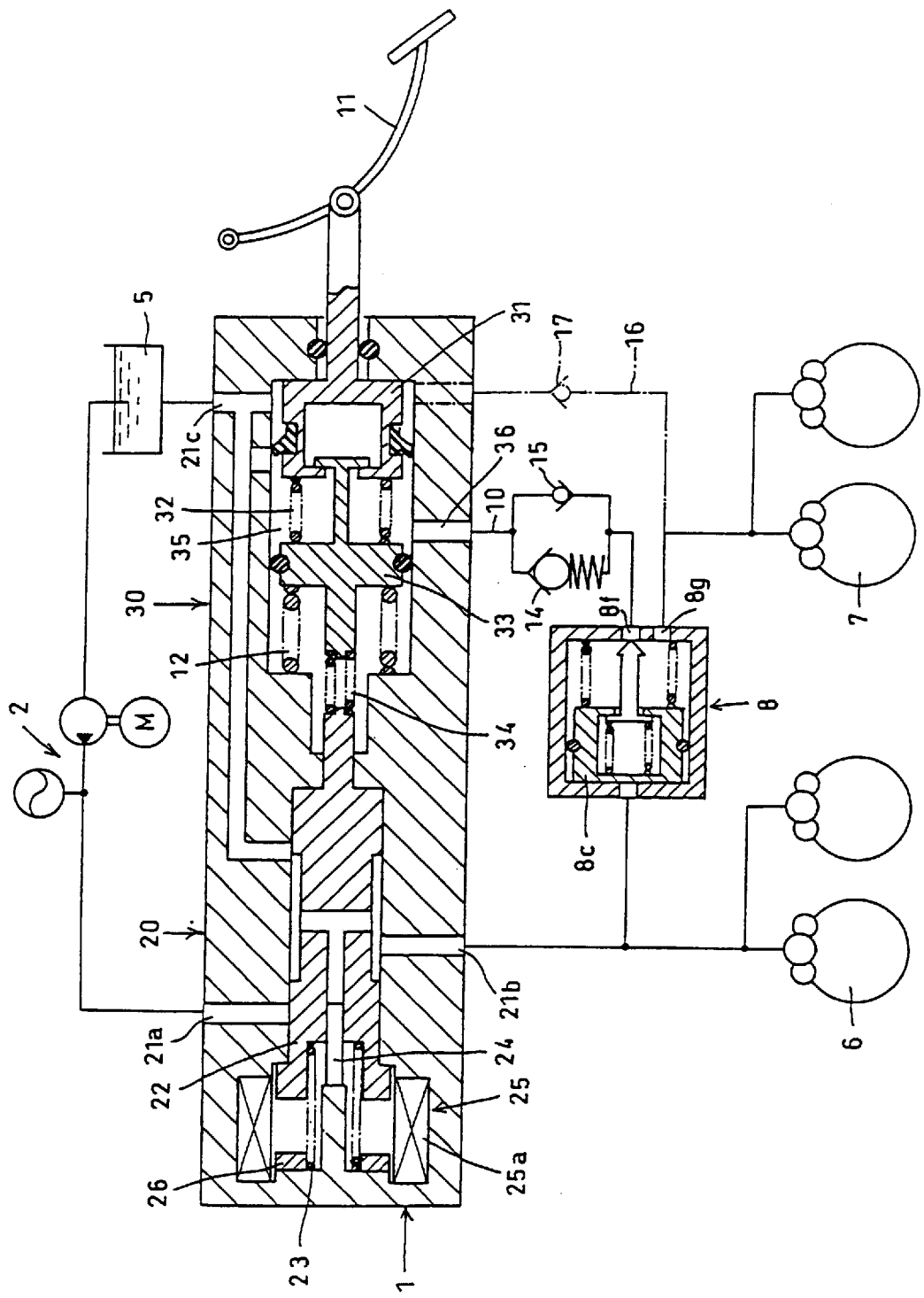
FIG. 4 is a view showing a third embodiment in which a relief valve and a check valve are added to the device of FIG. 3.

In the device of the third embodiment shown in FIG. 4, as a measure for this problem, a relief valve 14 which opens at a preset pressure to pass only fluid from the hydraulic pressure generator 30 toward the wheel brake side, and a check valve 15 that passes only the return fluid from the wheel brake side are arranged parallel to each other in the passage 10.

Figure 5:
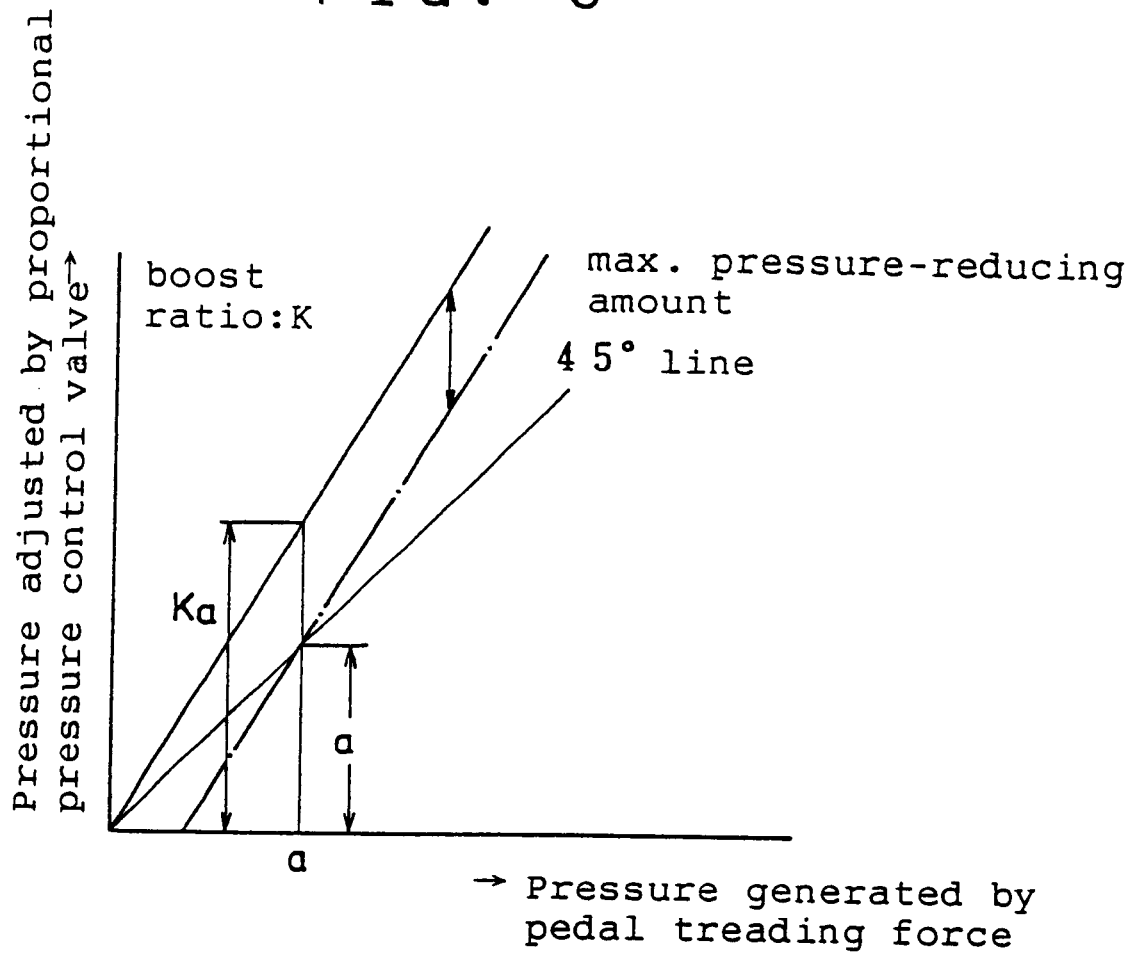
FIG. 5 is a view showing the characteristics of the device provided with the relief valve.

For example, in regenerative brake control in a hybrid car or electric car, depending on the specifications of the wheel-driving motor or battery, regenerative braking force that can be generated is limited. The wheel brake pressure corresponding to the limit value is the maximum pressure-reducing amount. In the device of FIG. 4, if we try to reduce pressure by an amount equal to the maximum pressure-reducing amount, while the pressure is higher than a in FIG. 5, it can be controlled as in a chain line. But while it is under a, the pressure can be reduced only along the 45° line (that is, pressure-rise line when the boost ratio is 1:1).

$ka$=maximum pressure-reducing amount=$a$ Thus, $a$=maximum pressure-reducing amount/$(k-1)$ Thus, a relief valve 14 which opens at point a. With this arrangement, even if the pressure in the wheel brakes 7 drops to a or under, the relief valve 14 closes, so that fluid from the hydraulic pressure generator 30 will not flow into the copy valve 8. Thus, it is possible to carry out pressure-reducing control along the chain line even in the pressure range under point a.

In case of failure of the pressure source or the first line, after the wheel brakes in the second line have been pressurized by the hydraulic pressure generator 30, even if the driver tries to release the pressure by releasing the brake pedal, the relief valve 14 prevents the brake fluid from the wheel brakes 7 from returning to the reservoir 5. The check valve 15 is provided to eliminate this problem.

With the relief valve 14 provided in the passage 10, if the fluid amount in the brakes in the second line increases e.g. due to wear of the pads, so that the fluid amount in the copy valve 8 becomes insufficient, the return of the piston 8c mounted in the copy valve 8 may be influenced and part of the hydraulic pressure generated in the hydraulic pressure generator 30 may be consumed to return the piston 8c during failure of the first line. This problem can be solved by providing a bypass 16 for communicating the reservoir 5 with the output port 8g of the copy valve 8 as shown by chain line in FIG. 4 and providing therein a check valve 17 for allowing only a fluid flow from the reservoir 5 toward the copy valve 8.

Figure 6:
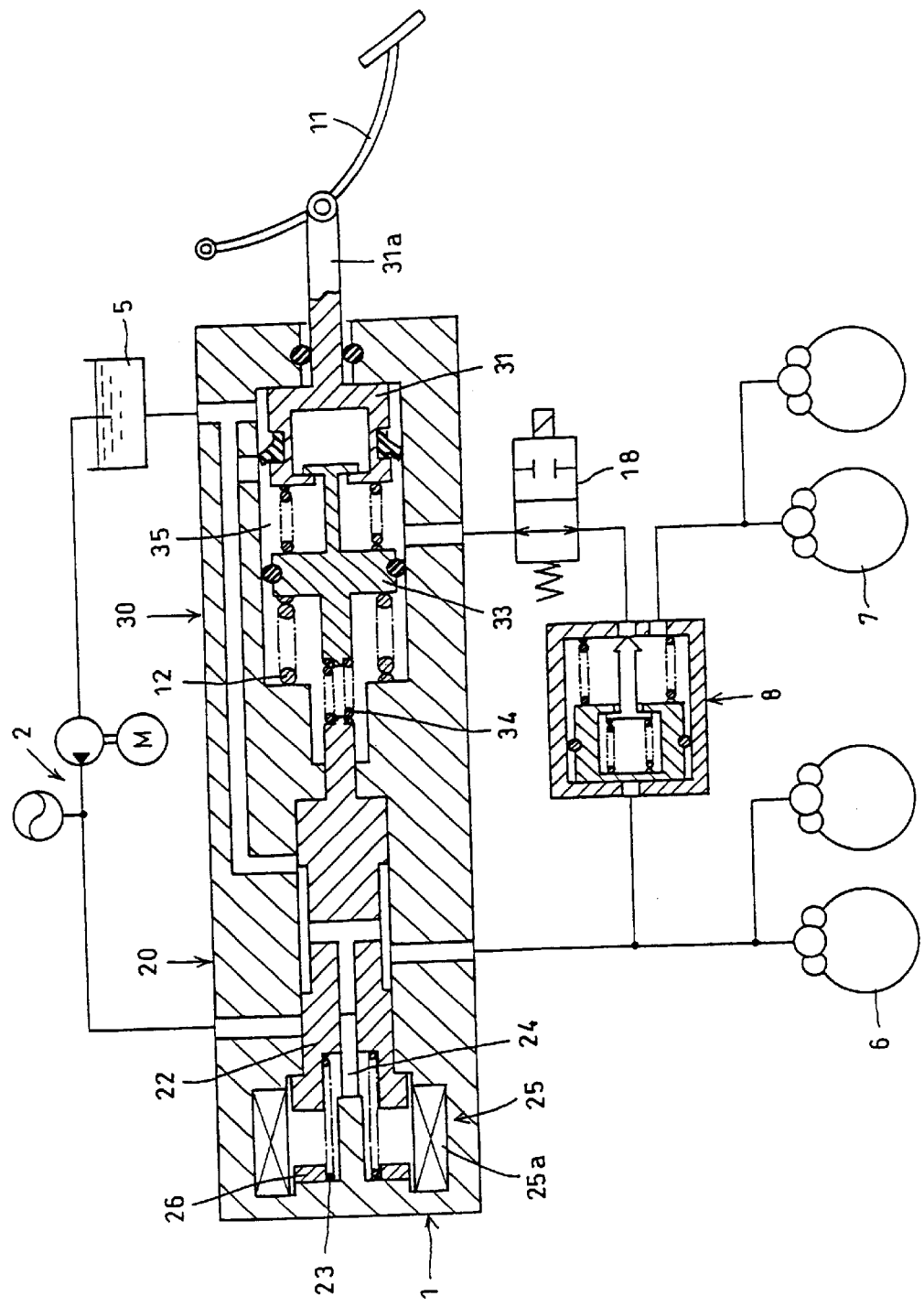
FIG. 6 is a view showing a fourth embodiment in which the relief valve is replaced with an electromagnetic valve.

FIG. 6 is the fourth embodiment in which instead of the relief valve 14, a normally open electromagnetic valve 18 is provided in the passage 10. By shutting off the passage 10 with the electromagnetic valve 18 during normal braking or when the pressure is reduced to a pressure lower than the hydraulic pressure generated by the hydraulic pressure generator 30 with a hydraulic pressure control valve, and opening the passage 10 during failure of the pressure source 2 or the first line, a function equivalent to the device of FIG. 4 is obtained.

Japanese patent publication 11-227584 discloses a brake device having similar functions to the devices of FIGS. 3, 4 and 6. But since in this device, a power valve having a structure similar to a tandem master cylinder and a hydraulically controlled valve (which is a proportional pressure control valve having a linear actuator) are combined independently so that the pedal force can be applied to both of them, the structure is unavoidably complicated.

In contrast, with the brake device of the present invention, the proportional pressure control valve 20 and the hydraulic pressure generator 30 are integrated and their internal structure is simplified. Thus, it is superior to the device of the publication in cost, mountability on a vehicle, etc.

Figure 7:
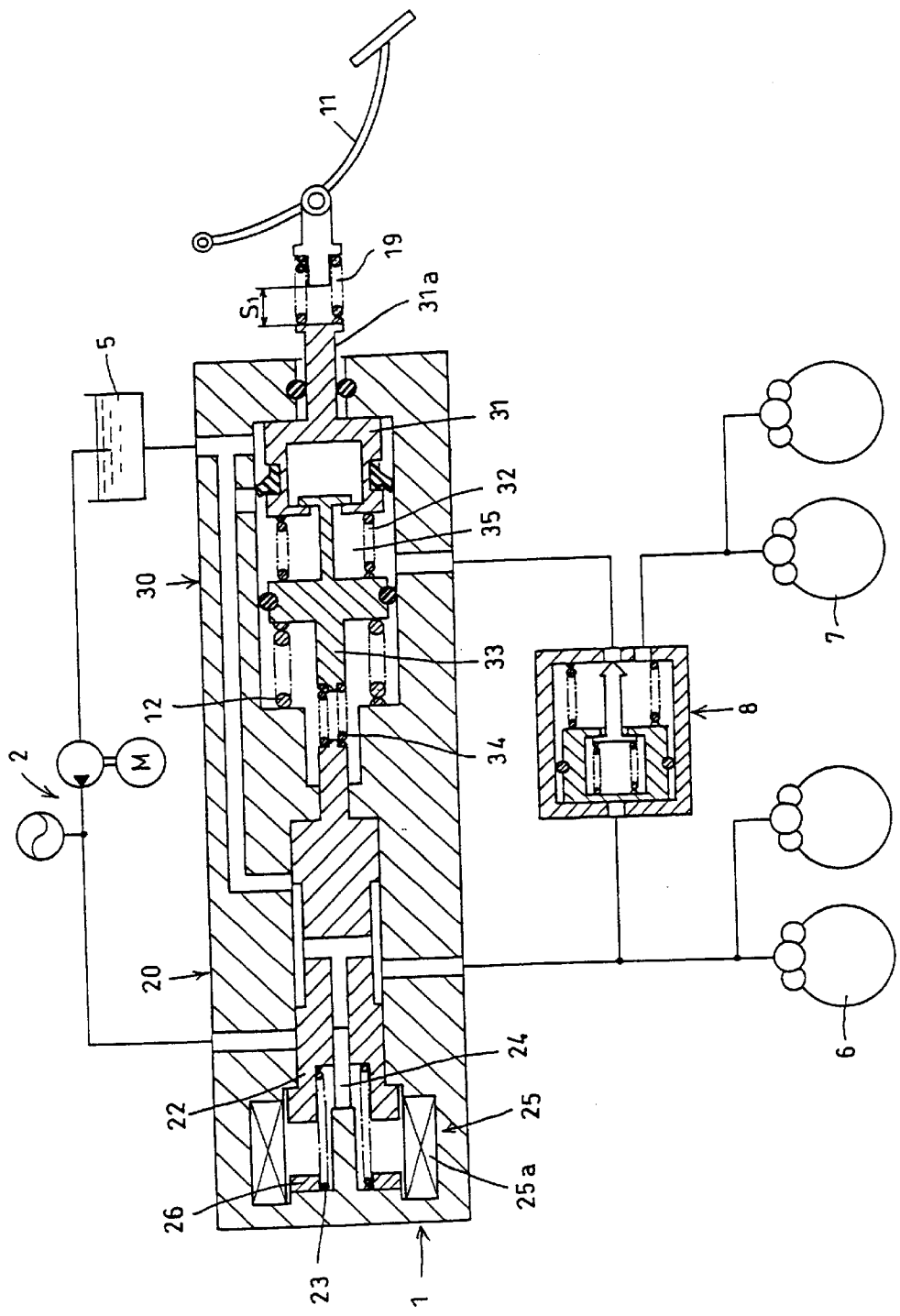
FIG. 7 is a view showing a fifth embodiment in which a dummy spring is provided.

FIG. 7 is the fifth embodiment in which a gap of the stroke S1 and a dummy spring 19 are provided between the brake pedal 11 and the input rod 31a.

Generally, a brake which during light braking, can be easily controlled with a longer pedal stroke and in the region of strong braking, works reliably with a shorter stroke is said to be desirable brake pedal feel.

Figure 8:
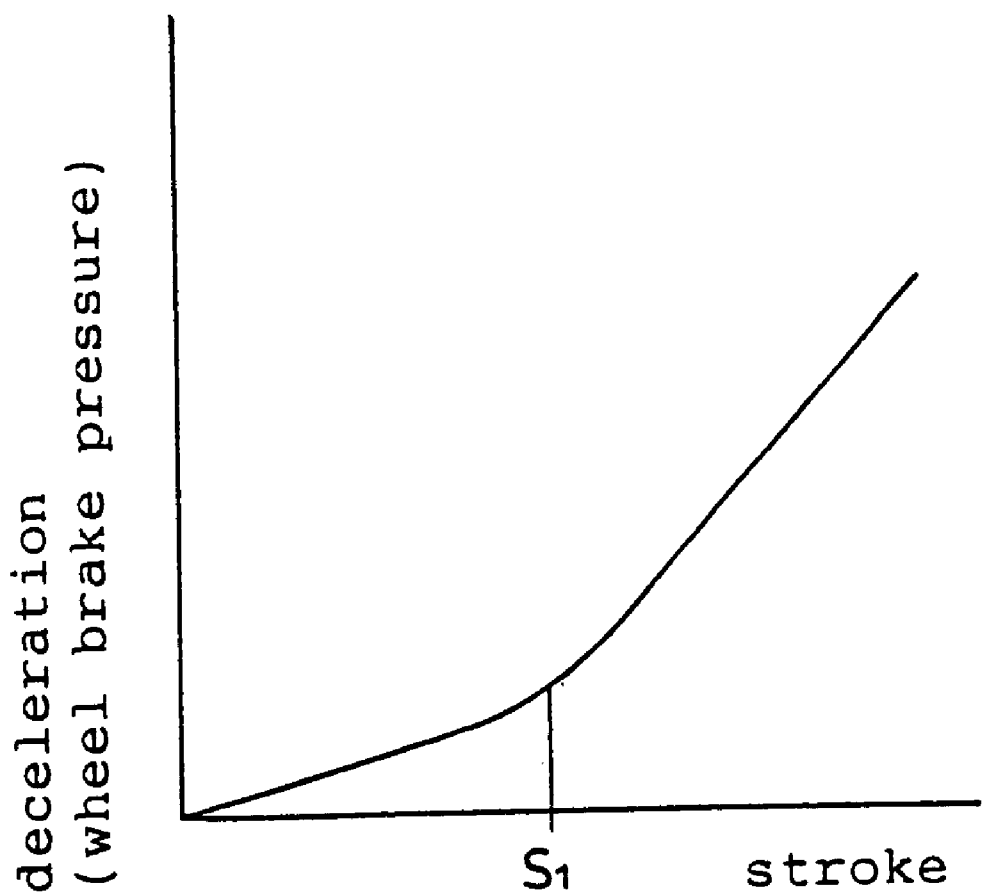
FIG. 8 is a view showing characteristics of desirable brake pedal feel.

With the device of FIG. 7, the spring constant of the dummy spring 19 is set to be smaller than that of the reaction-force spring 12, so that the operating amount to the brake pedal 11 is reduced by the springs 19 and 12 to move the pistons 31 and 33. Thus, the input to the spool valve 22 decreases, so that the hydraulic pressure supplied to the wheel brakes (that is, hydraulic pressure adjusted by the proportional pressure control valve 20) also decreases. Thus, it is possible to carry out pressure control in the region below the stroke S1 of FIG. 8.

After the gap of the stroke S1 has been completely absorbed, the input from the brake pedal is applied directly to the first piston 31, so that the input to the spool valve 22 also increases. Thus, the hydraulic pressure adjusted by the proportional pressure control valve increases, so that it is possible to carry out control in the region exceeding the stroke S1 in FIG. 8. Thus, desirable brake pedal feel can be obtained without using a complicated mechanism and without electronic control.

Figure 9:
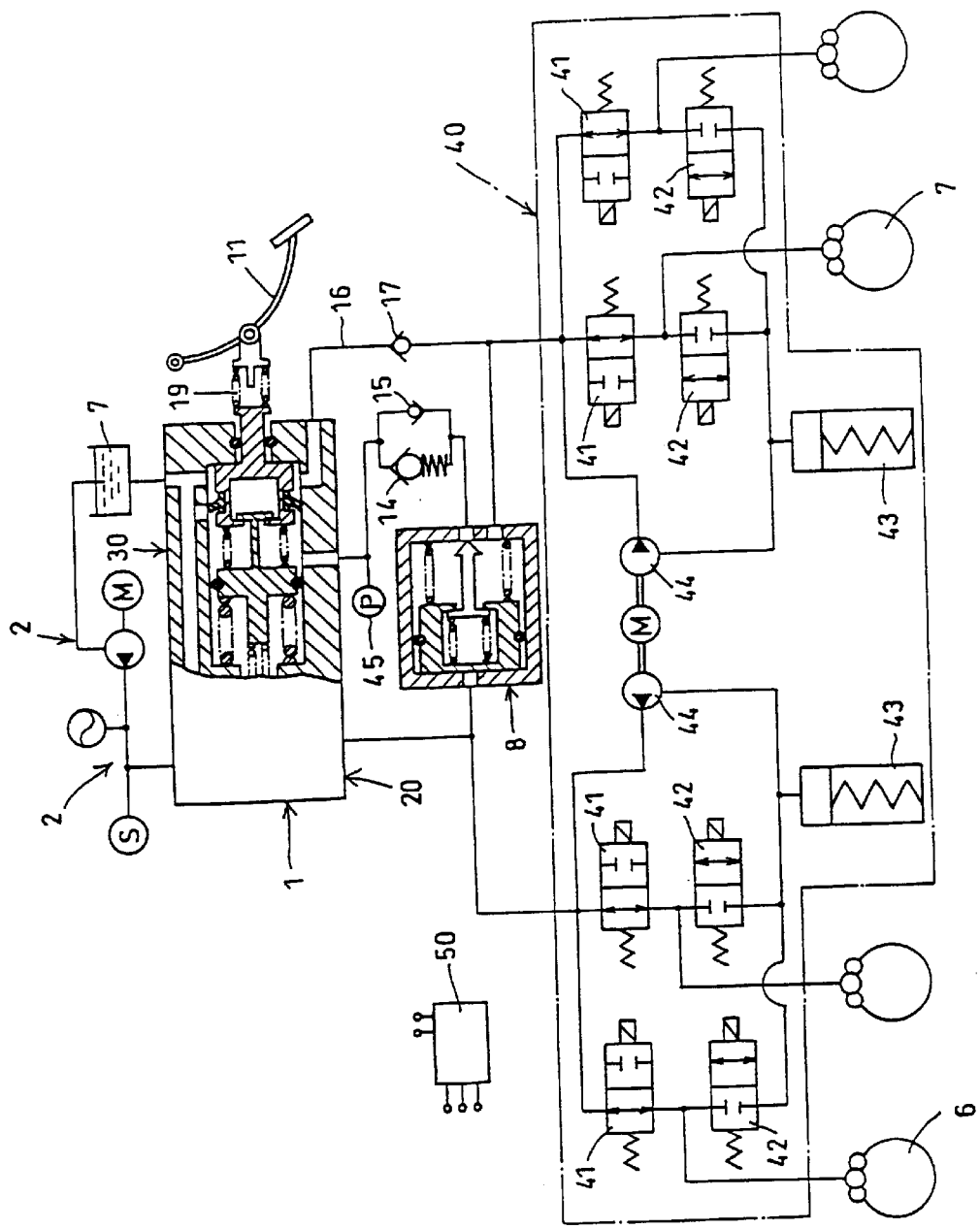
FIG. 9 is a view showing a sixth embodiment in which pressure-adjusting units are additionally provided.

FIG. 9 is the sixth embodiment in which a pressure-adjusting unit 40 and an electronic control device 50 are further added to the above-described device having the relief valve 14, check valves 15 and 17 (which can be replaced with the electromagnetic valve 18 of FIG. 6), and dummy spring 18 to permit antilock control (ABS), traction control (TCS), active stability control (ASC), etc.

The pressure-adjusting unit 40 comprises electromagnetic valves 41, 42 for increasing, reducing and holding the wheel brake pressure in response to the command from the electronic control device 50, a low-pressure fluid reservoir 43 for storing brake fluid discharged from the wheel brakes 6 and 7, and a power-driven pump 44 for sucking and pressurizing the brake fluid stored in the low-pressure fluid reservoir 43 and returning it toward the wheel brakes.

Pressure-adjusting units 40 as shown in the figure to which an electronic control device 50 is attached for antilock control or the like are mass-produced and commercially available, and they can be used.

By providing the pressure-adjusting unit 40, one set of brake device is provided with a plurality of pressure sources including power-driven pumps. But the use of a mass-produced, inexpensive pressure-adjusting unit is more advantageous in cost than using a single pressure source 2 for automatic pressurization and re-pressurization after pressure reduction of the brake of each wheel based on the command from the electronic control device 50.

When carrying out antilock control, traction control, active stability control, etc, various kinds of sensors (which are known) for feeding information signals necessary to determine optimum braking conditions, such as wheel speed sensors, are added to the electronic control device 50. Also, a sensor capable of detecting the input by the driver, such as a stroke sensor for detecting the brake operating amount, a brake pedal force sensor or a pressure sensor for detecting the hydraulic pressure generated by the brake operation, is also necessary. The device of FIG. 9 includes a pressure sensor 45 for detecting the hydraulic pressure generated by the hydraulic pressure generator 30.

As described above, the hydraulic pressure control device of this invention and the brake device for a vehicle using it have a hydraulic pressure generator integrated with a proportional pressure control valve so that the brake pedal force is applied through the first piston and second piston of the hydraulic pressure generator to the spool valve of the proportional pressure control valve as an external force, and during a failure in which no hydraulic pressure is supplied to the first line, a copy valve, which is provided between the passages of the first and second lines, opens to supply the hydraulic pressure generated in the hydraulic pressure generator to the wheel brakes in the second line. Thus, it is possible to eliminate a situation in which the brakes cannot be applied.

When no braking force control such as regenerative blending braking is necessary, pressure adjustment corresponding to the brake operating force by the driver can be carried out without electronic control, so that it is possible to provide a simple and inexpensive braking force control device.

Further, with the one in which the first spring of the hydraulic pressure generator is compressed after a full stroke of the second piston, it is possible to move the brake pedal to a pressure-application starting point by the first piston with a light stepping force.

With the one in which a reaction-force spring for the brake pedal is mounted in the hydraulic pressure generating device, and a relief valve or an electromagnetic valve is provided in the passage in the first line extending from the hydraulic pressure generator to the copy valve, when it is desired to reduce the wheel brake hydraulic pressure in the second line (=fluid in the first line) to a lower pressure than the pressure generated by the hydraulic pressure generator, even if the copy valve is open, it is possible to reduce the pressure of the wheel brakes in the second line to a desired pressure by preventing the supply of brake fluid from the hydraulic pressure generator. Thus it is possible to carry out e.g. regenerative braking.

Also, with the one provided with a dummy spring, it is possible to provide desirable brake pedal feel.

With the one provided with a pressure-adjusting unit having an electronic control device, antilock control, traction control, active safety control, etc., are possible and sophisticated vehicle behavior control is possible with a simple device.

What is claimed is:

1. A hydraulic pressure control device comprising a housing formed with an input port, an output port and a discharge port, and a proportional pressure control valve and a hydraulic pressure generator mounted in said housing, said proportional pressure control valve having a spool valve and a return spring for biasing said spool valve, said spool valve bringing said output port into communication with said discharge port in a non-operated state, bearing hydraulic pressure on its opposed pressure-bearing surfaces having a difference in area, and moving to a balance point where the sum of the hydraulic pressure and the force of said return spring balances with an external force applied opposite thereto to change over connections of said output port to said input port and said discharge port, adjust the degree of opening of fluid passages, and adjust the hydraulic pressure at said output port to a value corresponding to the external force, said hydraulic pressure generator combined with said proportional pressure control valve, said hydraulic pressure generator comprising a first piston receiving brake pedal force as the external force, a second piston receiving the brake pedal force from said first piston through a first spring, and a fluid chamber formed between said first piston and said second piston, said hydraulic pressure generator discharging brake fluid through an output port, said hydraulic pressure control device further comprising a second spring abutting an end of said second piston opposite an end of said second piston abutting said first spring, said second spring converting movement of said second piston to a load and transmitting force to said spool valve, and said hydraulic pressure generator, said second spring and said proportional pressure control valve are arranged in series in this order.

2. A brake device for a vehicle comprising the hydraulic pressure control device as claimed in claim 1, a pressure source connected to said input port of said hydraulic pressure control device, wheel brakes in a first line connected with said output port, wheel brakes in a second line connected with said output port of said hydraulic pressure generator, and a copy valve actuated by the hydraulic pressure difference between the first line and the second line to open and close a passage extending from said hydraulic pressure generator to the wheel brakes in the second line, said copy valve having a piston bearing fluid pressure in the first line on one side for pressurizing the wheel brakes in the second line, and a reservoir connected to said discharge port of said proportional pressure control valve, wherein brake fluid is supplied from said reservoir to a fluid chamber between said first and second pistons of said hydraulic pressure generator, and during failure of said pressure source, the hydraulic pressure generated in said hydraulic pressure generator is supplied to the wheel brakes in said second line.

3. A brake device for a vehicle as claimed in claim 2 wherein the spring force of said first spring of said hydraulic pressure generator is greater than the sum of the force of said second spring and the sliding resistance of said second piston, and wherein brake fluid is pressurized by said first piston after said second piston has reached the end point of its travel.

4. A brake device for a vehicle as claimed in claim 3 wherein a pressure-bearing unit having a housing and a piston mounted in said pressure bearing unit housing for bearing the hydraulic pressure of said pressure source on one side is provided, and wherein one end of a reaction-force spring for returning the brake pedal is supported on the other side of said piston of said pressure-bearing unit.

5. A brake device for a vehicle as claimed in claim 2 wherein a reaction-force spring for returning the brake pedal is provided between said second piston and said proportional pressure control valve.

6. A brake device for a vehicle as claimed in claim 5 wherein a relief valve which opens at a preset pressure and permits a fluid flow from said hydraulic pressure generator toward said copy valve and a check valve that permits only a fluid flow from said copy valve toward said hydraulic pressure generator are arranged parallel to each other in a passage in the second line.

7. A brake device for a vehicle as claimed in claim 6 wherein a bypass which brings said reservoir and the wheel brakes in the second line into communication with each other while bypassing said relief valve, check valve and copy valve is provided, and a check valve which permits only a fluid flow from said reservoir toward the wheel brakes in the second line is provided in said bypass.

8. A brake device for a vehicle as claimed in claim 5 wherein in a passage extending from said hydraulic pressure generator toward said copy valve, an electromagnetic valve for opening and closing the passage is provided which closes while the brake pedal is operated with the pressure source normally working or while pressure is reduced by said proportional pressure control valve to a pressure lower than the hydraulic pressure generated in said hydraulic pressure generator, and opens if the pressure source fails.

9. A brake device for a vehicle as claimed in claim 5 wherein a predetermined gap is provided between the brake pedal and said first piston, and wherein until said gap is absorbed, the operating force to the brake pedal is inputted to said first piston through a dummy spring having a smaller spring constant than said reaction-force spring.

10. A brake device for a vehicle as claimed in claim 3 wherein a pressure-adjusting unit is provided between said copy valve and the wheel brakes, said pressure-adjusting unit comprising an electromagnetic valve for increasing and reducing the wheel brake pressure based on a command from an electronic control device, a low-pressure fluid reservoir for storing the brake fluid discharged from the wheel brakes, and a power-driven pump for pressurizing the brake fluid stored in said low-pressure fluid reservoir and returning it toward the wheel brakes.

11. A brake device for a vehicle as claimed in claim 6 wherein a predetermined gap is provided between the brake pedal and said first piston, and wherein until said gap is absorbed, the operating force to the brake pedal is inputted to said first piston through a dummy spring having a smaller spring constant than said reaction-force spring.

12. A brake device for a vehicle as claimed in claim 7 wherein a predetermined gap is provided between the brake pedal and said first piston, and wherein until said gap is absorbed, the operating force to the brake pedal is inputted to said first piston through a dummy spring having a smaller spring constant than said reaction-force spring.

13. A brake device or a vehicle as claimed in claim 8 wherein a predetermined gap is provided between the brake pedal and said first piston, and wherein until said gap is absorbed, the operating force to the brake pedal is inputted to said first piston through a dummy spring having a smaller spring constant than said reaction-force spring.

14. A brake device for a vehicle as claimed in claim 4 wherein a pressure-adjusting unit is provided between said copy valve and the wheel brakes, said pressure-adjusting unit comprising an electromagnetic valve for increasing and reducing the heel brake pressure based on a command from an electronic control device, a low-pressure fluid reservoir for storing the brake fluid discharged from the wheel brakes, and a power-driven pump for pressurizing the brake fluid stored in said low-pressure fluid reservoir and returning it toward the wheel brakes.

15. A brake device for a vehicle as claimed in claim 5 wherein a pressure-adjusting unit is provided between said copy valve and the wheel brakes, said pressure-adjusting unit comprising an electromagnetic valve for increasing and reducing the wheel brake pressure based on a command from an electronic control device, a low-pressure fluid reservoir for storing the brake fluid discharged from the wheel brakes, and a power-driven pump for pressurizing the brake fluid stored in said low-pressure fluid reservoir and returning it toward the wheel brakes.

16. A brake device for a vehicle as claimed in claim 6 wherein a pressure-adjusting unit is provided between said copy valve and the wheel brakes, said pressure-adjusting unit comprising an electromagnetic valve for increasing and reducing the wheel brake pressure based on a command from an electronic control device, a low-pressure fluid reservoir for storing the brake fluid discharged from the wheel brakes, and a power-driven pump for pressurizing the brake fluid stored in said low-pressure fluid reservoir and returning it toward the wheel brakes.

17. A brake device for a vehicle as claimed in claim 7 wherein a pressure-adjusting unit is provided between said copy valve and the wheel brakes, said pressure-adjusting unit comprising an electromagnetic valve for increasing and reducing the wheel brake pressure based on a command from an electronic control device, a low-pressure fluid reservoir for storing the brake fluid discharged from the wheel brakes, and a power-driven pump for pressurizing the brake fluid stored in said low-pressure fluid reservoir and returning it toward the wheel brakes.

18. A brake device for a vehicle as claimed in claim 8 wherein a pressure-adjusting unit is provided between said copy valve and the wheel brakes, said pressure-adjusting unit comprising an electromagnetic valve for increasing and reducing the wheel brake pressure based on a command from an electronic control device, a low-pressure fluid reservoir for storing the brake fluid discharged from the wheel brakes, and a power-driven pump for pressurizing the brake fluid stored in said low-pressure fluid reservoir and returning it toward the wheel brakes.

19. A brake device for a vehicle as claimed in claim 9 wherein a pressure-adjusting unit is provided between said copy valve and the wheel brakes, said pressure-adjusting unit comprising an electromagnetic valve for increasing and reducing the wheel brake pressure based on a command from an electronic control device, a low-pressure fluid reservoir for storing the brake fluid discharged from the wheel brakes, and a power-driven pump for pressurizing the brake fluid stored in said low-pressure fluid reservoir and returning it toward the wheel brakes.

20. A brake device for a vehicle as claimed in claim 11 wherein a pressure-adjusting unit is provided between said copy valve and the wheel brakes, said pressure-adjusting unit comprising an electromagnetic valve for increasing and reducing the wheel brake pressure based on a command from an electronic control device, a low-pressure fluid reservoir for storing the brake fluid discharged from the wheel brakes, and a power-driven pump for pressurizing the brake fluid stored in said low-pressure fluid reservoir and returning it toward the wheel brakes.

* * * * *

UNITED STATES PATENT AND TRADEMARK OFFICE
CERTIFICATE OF CORRECTION

PATENT NO.    : 6,644,760 B2
DATED         : November 11, 2003
INVENTOR(S)   : K. Nakano et al.

It is certified that error appears in the above-identified patent and that said Letters Patent is hereby corrected as shown below:

Column 11,
Line 25, "or" should be -- for --.
Line 35, "heel" should be -- wheel --.

Signed and Sealed this

Sixth Day of July, 2004

JON W. DUDAS
*Acting Director of the United States Patent and Trademark Office*